United States Patent [19]

Etzel et al.

[11] 4,314,905

[45] Feb. 9, 1982

[54] COLUMNAR FINE MESH MAGNETIZED ION EXCHANGE RESIN SYSTEM

[75] Inventors: James E. Etzel, Lafayette, Ind.; Anthony M. Wachinski, Panama City, Fla.

[73] Assignee: Purdue Research Foundation, Lafayette, Ind.

[21] Appl. No.: 143,663

[22] Filed: Apr. 25, 1980

Related U.S. Application Data

[63] Continuation of Ser. No. 957,182, Nov. 2, 1978, abandoned.

[51] Int. Cl.³ .............................................. B01J 49/00
[52] U.S. Cl. ................................... 210/670; 210/679; 210/687; 210/269; 210/223
[58] Field of Search ............... 210/222, 491, 496, 680, 210/223, 266, 506, 670, 679, 687, 269

[56] References Cited

U.S. PATENT DOCUMENTS

| | | | |
|---|---|---|---|
| 3,560,378 | 2/1971 | Weiss et al. | 210/680 |
| 4,201,827 | 5/1980 | Heitkamp | 210/222 X |
| 4,214,986 | 7/1980 | Watson et al. | 210/222 X |

Primary Examiner—S. Leon Bashore
Assistant Examiner—Ferris H. Lander
Attorney, Agent, or Firm—Biebel, French & Nauman

[57] ABSTRACT

A method and apparatus for water softening using less than approximately 20 micron diameter fine mesh magnetized ion exchange particles in columnar operation. The particles are formed by encapsulating a core of magnetic material in ion exchange resin. The particles are magnetized and disposed in a column where they attach to magnetic mesh retention means such as stainless steel wool. The design of the column permits use of the fine mesh ion exchange particles and their properties of rapid exchange rates and efficient utilization of resin capacity while avoiding prior art problems of plugging, fouling, and excessive pressure drop.

14 Claims, 2 Drawing Figures

COLUMNAR FINE MESH MAGNETIZED ION EXCHANGE RESIN SYSTEM

CROSS-REFERENCE TO RELATED APPLICATIONS

This application is a continuation of application Ser. No. 957,182, filed Nov. 2, 1978, now abandoned.

BACKGROUND OF THE INVENTION

A current practice by individual, institutional, industrial, and municipal consumers for the production of soft water is to use fixed-bed ion exchange resins, usually a sulfonated cation exchange resin such as a styrene-divinylbenzene copolymer. Hydraulic considerations currently limit resin particles to a size which gives maximum capactiy with an acceptable pressure drop at high flow rates. Most ion exchange resins used currently are generally sperical in shape and have diameters of 300 to 1000 microns (i.e., 20–50 mesh, U.S. Standard Screens).

However, the kinetics of 20–50 mesh resins impose limitations on column design that could be eliminated or at least significantly moderated by using a finer mesh resin. Fine mesh resins having diameters of only 15–20 microns (rather than the 300 to 1000 micron diameter resins now in use) have ion exchange rates on the order of 15 times faster than the conventional larger diameter resins and more efficient use of the ion exchange capacity. However, they have not been found acceptable for commercial use in the past because of hydraulic considerations. In fixed beds, fine mesh ion exchange resins cause excessive pressure drops, are prone to clogging and fouling, and are extremely difficult to backwash because they are easily carried out of the ion exchange column in the backwash cycle.

For many years the art has attempted to solve these problems so that advantage could be taken of the faster exchange rates achievable by using resins with increased surface area. For example, U.S. Pat. No. 2,460,516 to Luaces suggested that an ion exchange resin be deposited on the surface of a porous body to increase the surface area available during water softening. Voigtman, U.S. Pat. No. 2,798,850, disclosed coating felted or bat-type fibrous materials such as cellulosics, glass, or asbestos with various ion exchange resins to increase their exchange capacity.

Others have encapsulated magnetic particles in ion exchange resins. Examples of this are Weiss et al., U.S. Pat. Nos. 3,560,378, Turbeville, 3,657,119, and Weiss et al., 3,890,224. Weiss et al. 3,560,378 recognized the problems that fine ion exchange resins exhibited such as excessive pressure drop, quick fouling, and loss through entrainment. Their solution, however, was to use the encapsulated magnetic resins in an agitated mixer system during liquid treatment and then to magnetically coalesce the resin particles after treatment. Weiss et al. 3,560,378 did not purport to solve the problems associated with fine mesh resins when used in a fixedbed process. They did compare the reaction kinetics of gamma iron oxide particles encapsulated with trimethylol phenol N,N bis(3-amino propylmethylamine) having a particle size range of 250–500 microns with a standard size 350–1200 micron resin in fixed bed operation and found them to be substantially the same. However, no data on bed size, flow rates, or pressure drops was reported.

Svyadoshich et al. in "Wastewater Purification Using Superparamagnetic Dispersed Ion Exchanger in Constant Magnetic Field", 10 *Soviet Inventions Illustrated* 2 (#41 Nov. 1976), used a column surrounded by an electromagnetic coil which produced a magnetic field of 350 Oersted and a super-paramagnetic cation exchange resin (identified only as KU-2-8-f) 40–60 microns in diameter to obtain ion exchange rates eight times faster than conventional size resins.

In the field of water purification, attempts have been made to use high-gradient magnetic fields to separate and extract weakly paramagnetic submicron particles from fluid streams. DeLatour and Kolm, "High-Gradient Magnetic Separation: A Water Treatment Alternative", *J. Am. Water Works Assoc.* 325–327 (June 1976), discussed a number of suggestions for separation including possible use of a matrix of stainless steel wool in a column under the influence of a magnetic field to capture and hold magnetic particles from a fluid stream.

However, none of the above-mentioned prior art has satisfactorily solved the problems associated with fine mesh resins in fixed-bed columnar operation. Accordingly, the need still exists for increasing the efficiency of ion exchange processes which use fixed-bed columnar operation and yet will avoid the problems associated with fine mesh ion exchange resins when used in such columns.

SUMMARY OF THE INVENTION

Barium ferrite powder or other suitable ferromagnetic materials having a particle size of about 2 microns is encapsulated within an ion exchange resin, yielding a final particle size of less than approximately 20 microns. The particles are then magnetized and distributed throughout an ion exchange column loosely filled with a magnetic mesh retention means such as stainless steel wool where they are allowed to attach themselves. The column is typically operated in a down or up flow mode, i.e., the liquid to be treated is transported to the top or bottom of the column and flows through the resin attached to the magnetic mesh retention means at rates of approximately 18 gpm/ft$^3$ (gallons per minute per cubic foot). In a preferred form of the invention, the resin is an organic polymer suitable for use in water softening. Softening is accomplished by the exchange of monovalent sodium cations on the resin for divalent cations in the liquid being treated. After breakthrough capacity is reached, the column is regenerated by flowing a regenerant solution such as a solution of sodium chloride at rates of up to about 6 gpm/ft$^3$ in a direction countercurrent or cocurrent to that of normal operation. Contact times of less than 30 minutes are sufficient for resin regeneration, and the magnetic mesh retention means maintains the ion exchange particles in the column.

Maintenance of a relatively high void volume throughout the column keeps pressure drops through the column at acceptable levels. For example, at flow rates of about 18 gpm/ft$^3$, only a 9 psi/ft of column bed drop was observed. For comparison purposes, the pressure drop in a column using nonmagnetic ion exchange resin of the same particle size approaches 1000 psi/foot of bed.

Accordingly, it is an object of this invention to enable use of fine mesh ion exchange particles (i.e., less than approximately 20 micron size) in a columnar mode of operation to obtain the advantages of rapid exchange rates and more efficient utilization of resin capacity.

DESCRIPTION OF THE PREFERRED EMBODIMENTS

Figure 1:
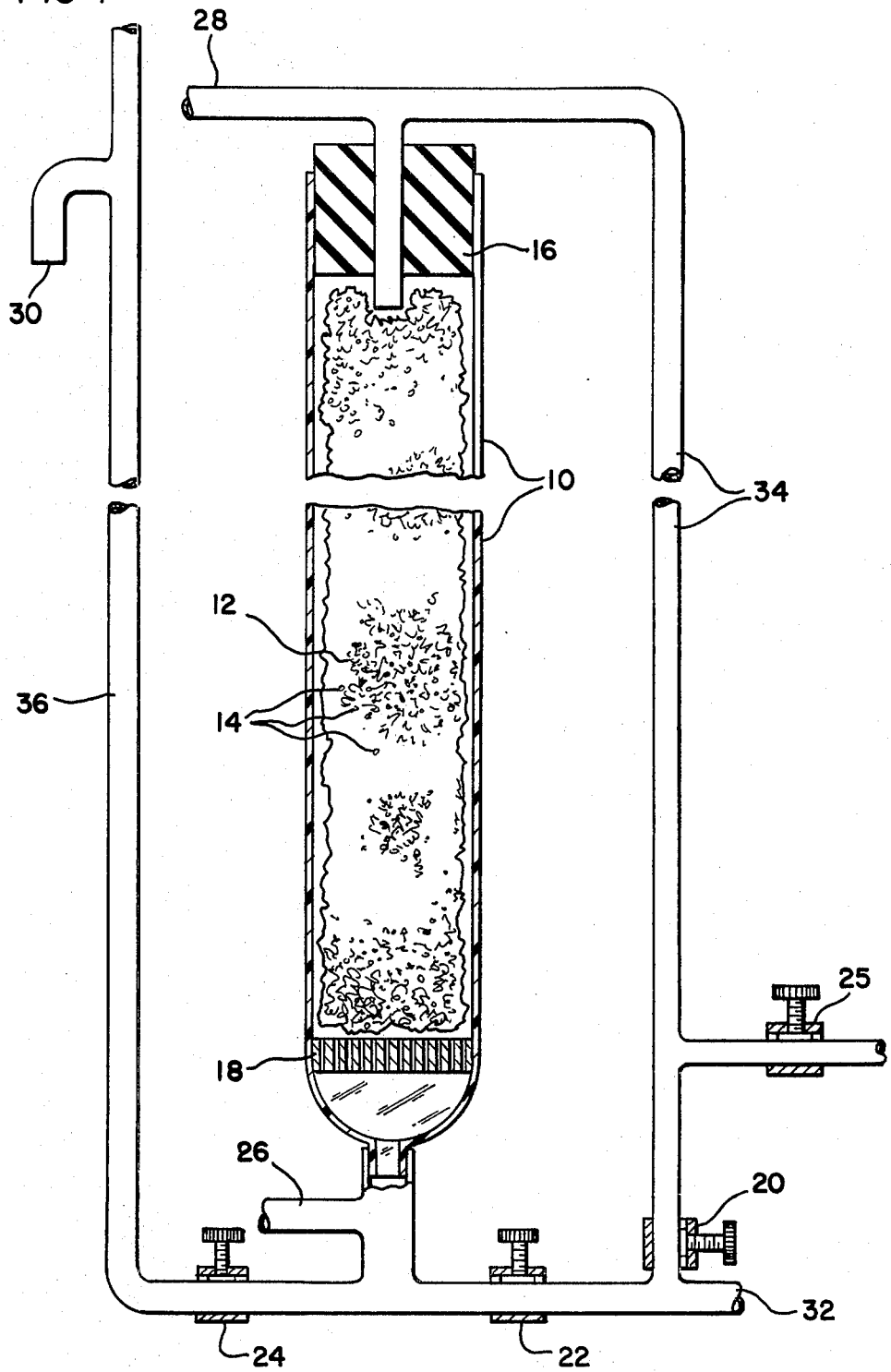
FIG. 1 is a diagrammatic representation of the ion exchange column containing magnetic mesh retention means used in the practice of this invention.

The fine mesh ion exchange particles used in the practice of this invention may be made by methods well known in the art. For example, magnetic ion exchange resin particles may be prepared using the methods disclosed by Weiss et al., U.S. Pat. Nos. 3,890,224 and 3,560,378. Although the preferred final particle size is approximately 15-20 micron, much smaller size resin particles, as small as 4-5 micron, are operable in the invention. Thickness of the resin excapsulation over the magnetic core material is not critical and may vary depending upon the final size of the particles desired. The magnetic core of the particle may consist of any suitable ferromagnetic material such as elemental iron, gamma iron oxide, magnetite, or barium ferrite ($BaFe_{12}O_{19}$). Barium ferrite is preferred because it is highly resistant to acids and bases, is relatively inexpensive, has a high magnetizing force, and exhibits a high degree of resistance to self-demagnetization.

Depending on the specific properties desired and the specific type of ions desired to be removed from (or added to) the liquid to be treated, a wide variety of both cation and anion exchange resins, well known in the art, may be used to encapsulate the magnetic core material. For example, the resins disclosed in Weiss et al., U.S. Pat. Nos. 3,890,224, 3,560,378, and 3,645,922 may be used. In most water softening systems, the ions which are removed from the water are divalent cations such as calcium and magnesium. Thus, in those systems, it is preferable to use a cation exchange resin such as styrene divinylbenzene resin or a sulfonated ethylene-vinyl acetate copolymer cross-linked about 25% with toluene diisocyanate.

After encapsulation, the particles are magnetized by exposing them to a magnetic field of 10,000 or more Gauss for about 5 minutes. A preferred method of magnetizing the particles is to slurry them into a square channel of 12 mm width and 3 mm thickness between faces of a laboratory magnet with 15.0 cm poles tapered to 5.0 cm faces. Fine mesh ion exchange particles magnetized in this manner will remain firmly attached to the magnetic mesh retention means of the invention at flow rates of up to about 18 gpm/ft$^3$ in both the operational and regeneration mode of the column. To distribute the fine mesh ion exchange particles evenly over the surface of the magnetic mesh retention means, water is pumped through the column containing the retention means at high flow rates of about 18-20 gpm/ft$^3$. The particles are slowly added to the column and are evenly distributed throughout the column by the flowing water. This even distribution remains during normal service operational flow rates of 2-4 gpm/ft$^3$ and normal regeneration flow rates of 4-5 gpm/ft$^3$ as well as at the higher flow rates mentioned above. Although even distribution of the fine mesh ion exchange particles is preferred, it is not critical to the operation of the system.

In domestic water softening applications, the preferred magnetic mesh retention means is stainless steel wool. The stainless steel wool serves two purposes. It serves as a matrix to which the magnetic resin particles attach themselves, and it also serves to provide a tortuous path for the liquid to be treated and fills extra space in the column. Thus, any fine mesh ion exchange particles dislodged during operation or regeneration may be captured by the extra wool downstream. To provide for an acceptably low pressure drop through the column during operation and yet provide sufficient area for the magnetic particles to attach, preferably, the magnetic mesh occupies only 2 to 5 percent of the total volume in the column. Even after the fine mesh ion exchange particles have been loaded onto the steel wool, about 80 percent of the volume in the column remains void space.

For industrial water treatment applications, where corrosive or acidic media may be encountered, the preferred magnetic mesh retention means is a material which will resist attack by corrosive or acidic media. Such mesh retention means may take the form of a ferromagnetic material such as stainless steel wool coated with an acid resistant coating or a magnetic material, such as nickel or nickel alloys, which are more resistant to acid attack or which have been treated to resist corrosion and acid attack.

Referring now to FIG. 1 which schematically illustrates the operation of an apparatus of the type which may be used in one embodiment of the present invention, water to be treated is pumped (by means not shown) through inlet 32 into pipe 34. During normal operation, valves 20 and 24 are open while valves 22 and 25 are closed. The water to be treated enters the top of column 10 and flows downwardly over the magnetized resin particles 14 attached to magnetic mesh retention means 12. The magnetic mesh retention means 12 is supported in the column by support 18. After passing through column 10, the treated water is pumped through pipe 36 to outlet 30. The measure pressure drop in the column for the results reported in the examples below, the column was attached to a mercury differential manometer at sampling points 26 and 28. A commercial embodiment of the column would not have the manometer hookup.

When the fine mesh ion exchange particles in the column need regeneration, valves 20 and 24 are closed and valves 22 and 25 are opened. Regenerant solution, such as a brine (sodium chloride) solution, is pumped through the column 10 in a direction countercurrent to normal operation. Optimum regenerating conditions vary with the particular ion exchange resin used. In water softening systems, brine concentrations ranging from 8 to 16 percent are generally used. Such concentrations are directly related to the degree of resin cross-linking. As brine concentration increases, it causes the resin to shrink thereby inhibiting migration of ions into and out of the resin. At lower brine concentrations, fewer sodium ions are available at any given time to displace divalent cations such as calcium and magnesium. It has been found that less concentrated brine solutions contacting the particles at high regeneration flow rates will yield the best results. The less concentrated brine solutions are less viscous, and it has been found that regeneration of the resin is much more rapid when the regenerant solution is in turbulent flow.

The following examples illustrate the advantages to be attained through use of the apparatus of the present invention.

EXAMPLE 1—Comparison of pressure drops

Figure 2:
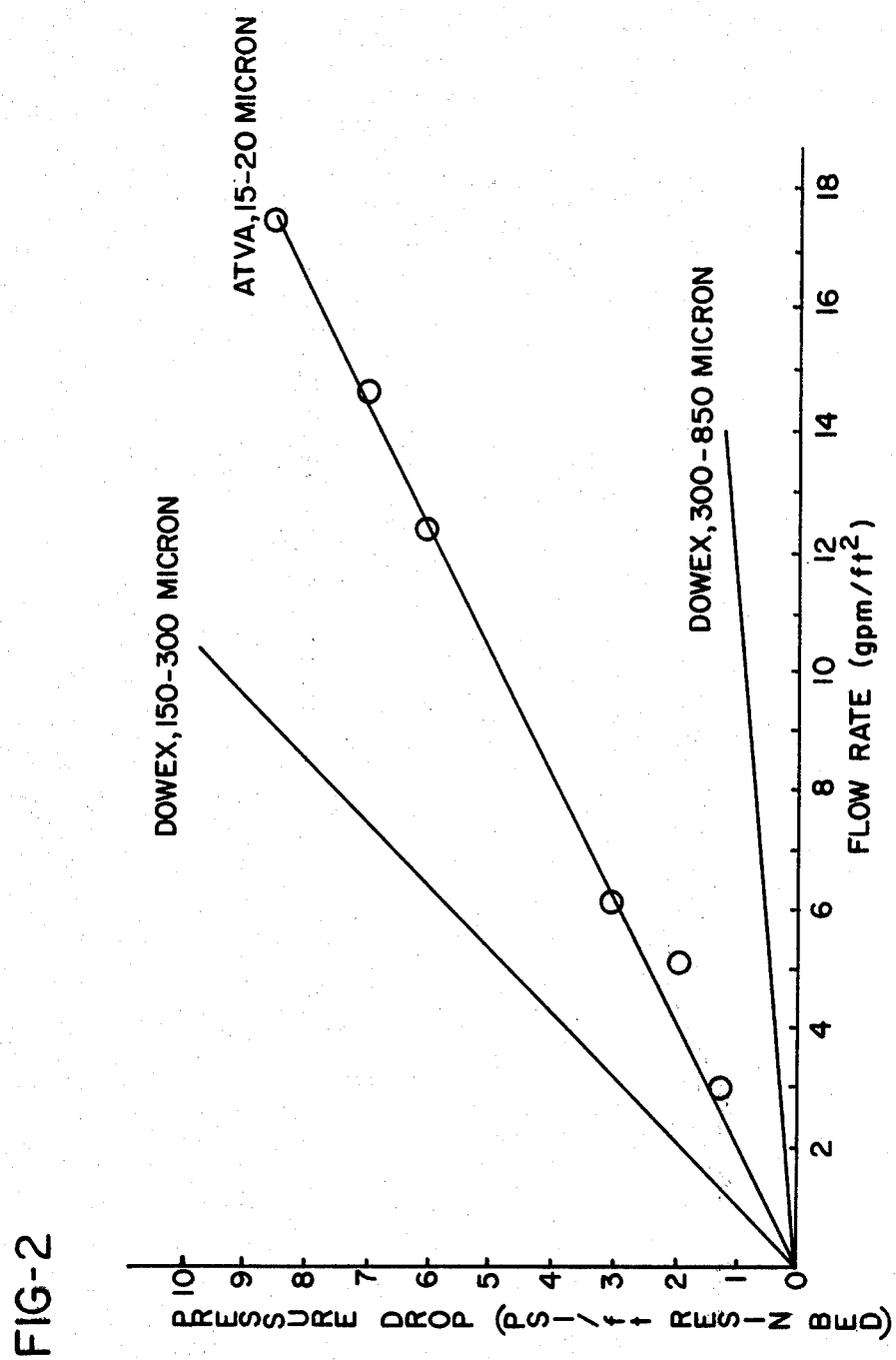
FIG. 2 is a graph comparing pressure drop versus flow rate for standard size resins and the fine mesh ion exchange particles of this invention in columnar operation.

Data published by Dow Chemical Company, *A Laboratory Manual on Ion Exchange* (1971), on the effects of flow rate (gpm/ft$^2$) versus pressure drop (psi/ft of resin bed) in columnar operation for a 300-850 micron and a 150-300 micron sized Dowex styrene divinylbenzene were compared with pressure drops encountered when using the apparatus of the present invention. For comparison purposes, 15-20 micron size particles comprising a barium ferrite core encapsulated with ethylene-vinyl acetate resin crosslinked about 25 percent with a toluene diisocyanate adduct were dispersed in about 0.013 ft$^3$ of a stainless steel wool mesh in a 20 mm inside diameter column 400 cm in length. The results of the comparison are shown in FIG. 2. As can be seen, pressure drops in columnar operation using the 15-20 micron particle size five mesh ion exchange particles of the present invention are actually less than that encountered using 150-300 micron particle size resin and compare favorably to the even larger 300-850 micron particle size resin.

EXAMPLE 2—Regeneration contact times

For maximum efficiency in regenerating most commercial ion exchange resin systems containing 300 to 1000 micron size styrene divinylbenzene resins, brine contact times (i.e., the length of time that the brine solution is in contact with the resin) should be about 50 minutes. Brine contact times of less than 10 minutes will decrease the operating capacity of the resin about 30 percent, and if brine contact times are reduced below 5 minutes, capacity will be decreased over 50 percent. Resin manufacturers recommend regeneration flow rates of from 0.2 to 1.0 gpm/ft$^3$, noting that lower operating capacities will result if flow rates deviate significantly from this range.

For comparison purposes, the 15-20 micron size fine mesh ion exchange particles of Example 1 were regenerated using a 10 percent brine concentration and a brine loading of 4 lbs. NaCl/ft$^3$. Results are reported in the table below.

| $Q_R$ (gpm/ft$^3$) | $t_{CR}$ (min) | $Q_S$ (gpm/ft$^3$) | $t_{CS}$ (min) | $X_{BT}$ (Kgr/ft$^3$) |
|---|---|---|---|---|
| 0.42$^a$ | 18.4 | 1.2 | 6.6 | 1.19 |
| 0.83$^a$ | 9.2 | 1.2 | 6.6 | 1.44 |
| 6.43$^a$ | 1.2 | 17.7 | 0.4 | 1.72 |
| 1.65$^b$ | 4.6 | 1.2 | 6.6 | 1.00 |
| 6.4$^{b,1}$ | 1.2 | 1.2 | 6.6 | 1.58 |

$^a$brine loading = 4 lbs NaCl/ft$^3$
$^b$brine loading = 8 lbs NaCl/ft$^3$
$^1$20% brine, all others at 10%
LEGEND:
$Q_R$ - Regen Flow Rate
$t_{CR}$ - Regen Contact Time
$Q_S$ - Service Flow Rate
$t_{CS}$ - Service Contact Time
$X_{BT}$ - Breakthrough Capacity 17 mg/l (1.0 grain/gallon)

As can be seen, for the particular fine mesh ion exchange particles used, regeneration flow rates above 6 gpm/ft$^3$ and brine contact times of as little as 1.2 min. yield significant increases in the operating capacity of the ion exchange particles. In fact, these data show that the greater the regeneration flow rate (within limits), the greater the increase in operating capacity (as shown by increased breakthrough capacity), and at brine contact times far less than those recommended for prior art systems.

EXAMPLE 3—Service cycle contact times

With bed depths of 30 inches or more, capacities obtained with conventionally sized ion exchange particle systems are decreased about 10 percent when service flow rates reach 10 gpm/ft$^3$ (contact time of about 2 minutes) and fall significantly with increasing flow. Decreasing bed depth while maintaining a constant flow rate has essentially the same effect. Thus, for most commercial systems, service flow rates in the range of 2 to 5 gpm/ft$^3$ (contact times of 7.5 to 3.75 minutes) are recommended.

Again, using the fine mesh ion exchange particles of Example 1 for comparison purposes, service cycle flow rates of from 1.2 to 17.7 gpm/ft$^3$ with corresponding contact times of 6.6 minutes to 25 seconds were run. As can be seen from the results reported in the table in Example 2, for the particular resin used, service flow rates far in excess of prior art systems were possible without decreasing the operating capacity of the system.

It is postulated that because of the extremely small particle size of the ion exchange particles used in the present invention, film diffusion (i.e., the diffusion of ions through the film of solution surrounding each particle) is the rate determining factor for the system used in the practice of this invention while for many prior art systems, particle diffusion (i.e., the diffusion of ions throughout a particle) is the rate determining factor. The above data bear this out because high flow rates serve to decrease the film thickness surrounding a given particle which increases the rate of exchange of film diffusion controlled systems. That is why high flow rates are advantageous to the system utilized in the practice of this invention.

As can be seen from the above examples, fine mesh ion exchange particles, i.e., less than approximately 20 micron particle size, can be used in the apparatus of the present invention with acceptable pressure drops during columnar operation while obtaining the rapid exchange benefits of the fine mesh ion exchange particles. Prior art plugging and fouling problems are avoided while the efficiency of the ion exchange process in water softening systems has been increased.

While the apparatus and methods herein described constitute preferred embodiments of the invention, it is to be understood that the invention is not limited to these precise methods or apparatus, and that changes may be made in either without departing from the scope of the invention, which is defined in the appended claims.

What is claimed is:

1. Apparatus for the ion exchange treatment of liquids with fixed-bed ion exchange resins comprising:
   a hollow column with an inlet and an outlet;
   magnetic mesh retention means disposed in said column so as to loosely fill said column with said magnetic mesh retention means; and
   fine mesh ion exchange particles having a core of magnetic material encapsulated in an ion exchange resin magnetically attached to and distributed substantially throughout said retention means, said ion exchange particles being retained by said retention means in said column during both operation and regeneration of said ion exchange particles to provide a fixed-bed ion exchange resin for the ion exchange treatment of liquids, whereby rapid exchange rates are achievable in said column without excessive pressure drop.

2. The apparatus of claim 1 wherein said particles have a size of less than approximately 20 microns.

3. The apparatus of claim 2 wherein said retention means comprise stainless steel wool.

4. The apparatus of claim 3 wherein said stainless steel wool occupies 2-5 percent of the total volume of said column.

5. The apparatus of claim 2 wherein said ion exchange resin is an anion exchange material.

6. The apparatus of claim 2 wherein said ion exchange resin is a cation exchange material.

7. The apparatus of claim 6 wherein said core is barium ferrite.

8. The apparatus of claim 1 further including a pump means for directing the liquid to be treated to said column and means for introducing a regenerant solution for said ion exchange resin into said column.

9. A method for the ion exchange treatment of liquids with fixed-bed ion exchange resins comprising the steps of:

conveying liquid to be treated to the inlet of a column, said column containing fine mesh ion exchange particles having a core of magnetic material encapsulated in an ion exchange resin magnetically attached to and distributed substantially throughout magnetic mesh retention means which loosely fills said column, said ion exchange particles being retained by said retention means in said column during both operation and regeneration of said ion exchange particles thereby providing a fixed-bed ion exchange resin for the ion exchange treatment of liquids;

contacting said liquid with said resin particles in said column for a time sufficient to effect an ion exchange; and conveying the treated liquid out of the column.

10. The method of claim 9 wherein the liquid to be treated is hard water, said ion exchange resin is a cation exchange material, and the treatment involves softening of said hard water to produce soft water.

11. The method of claim 10 wherein said particles have a size of less than approximately 20 microns.

12. The method of claim 11 wherein said retention means is a stainless steel wool.

13. The method of claim 12 wherein said particles are dispersed in said stainless steel wool by slowly adding said particles to said column as liquid is pumped through the column at rates of about 18-20 gpm/ft$^3$.

14. The method of claim 13 wherein said liquid to be treated is flowed through said column at a rate of less than about 18 gpm/ft$^3$ and said ion exchange resin is regenerated by treatment with a regenerant solution at a rate of less than about 18 gpm/ft$^3$.

* * * * *